J. G. TALBOT.
Gate.
No. 65,707.
Patented June 11, 1867.
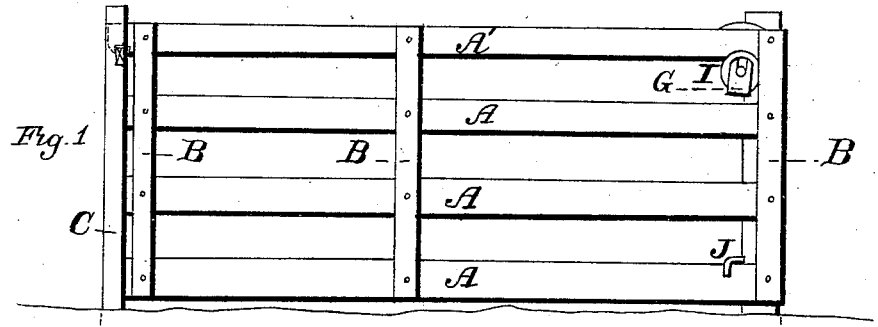
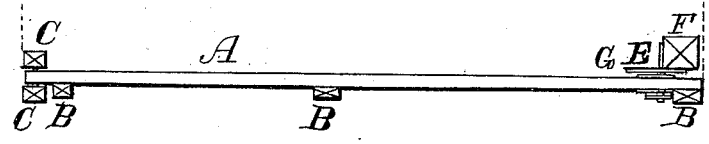
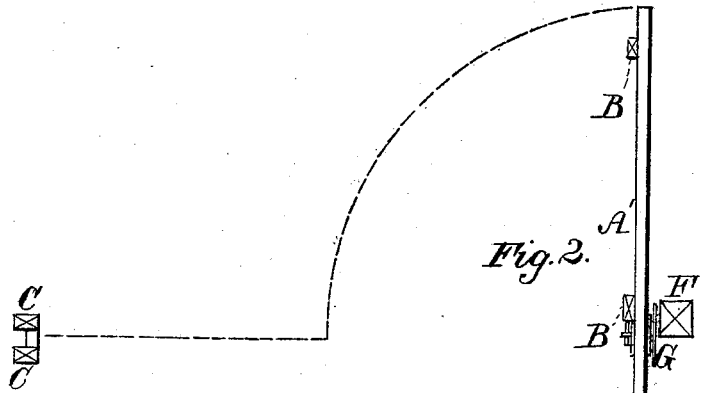
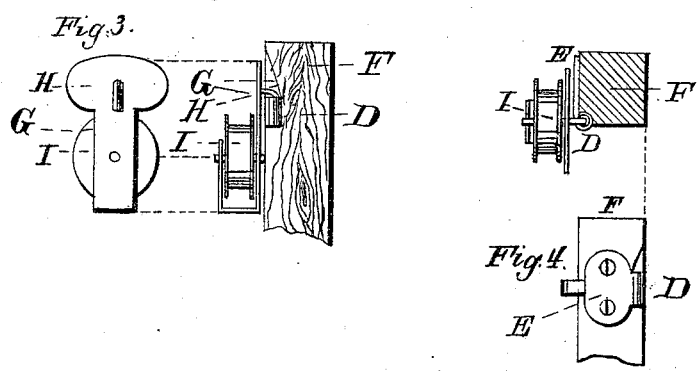
Witnesses.
J. Dennis Jr.
J. C. Connolly.
Inventor
John G. Talbot

United States Patent Office.

JOHN G. TALBOT, OF SLOANSVILLE, NEW YORK.

*Letters Patent No. 65,707, dated June 11, 1867.*

---

FARM-GATE.

---

The Schedule referred to in these Letters Patent and making part of the same.

---

TO ALL WHOM IT MAY CONCERN:

Be it known that I, JOHN G. TALBOT, of Sloansville, Schoharie county, State of New York, have invented certain new and useful improvements in Farm-Gates; and I do hereby declare the following description and accompanying drawings are sufficient to enable any person skilled in the art or science to which it most nearly appertains to make and use my said invention or improvements without further invention or experiment.

The nature of my invention and improvements consists in making or arranging the pivot on which the strap or bracket turns that carries the roller on one side of the strap or bracket, instead of making it at the top or bottom of the bracket, as heretofore practised; also in arranging a hook to hold the gate down, and preventing the cattle from lifting and removing it. In the accompanying drawings—

Figure 1 is an elevation of a gate with my improvements.

Figure 2 is a plan showing the gate open.

Figure 3 is the back side of the strap or bracket which carries the roller.

Figure 4 is the socket and plate in which the bracket hangs.

My improvements relate to that class of gates which are traversed endwise, and then swung around at a right angle to open the passage, and adapts this kind of gate to a single post when it swings.

In the drawings above mentioned, A A A are the three lower bars of the gate, and A' the top bar of the gate; and they are connected by three upright bars B B B, fastened firmly to the bars A and A', which project a little beyond the bar B at the left hand to enter between the posts C C C, which hold the gate when it is closed. I make a socket, D, with a flange, E, by which I fasten it to the post F; but this socket may be made with a shank to pass into or through the post, if preferred that way, or with two flanges at a right angle to each other, so as to fasten on to two sides of the post. I make a strap or bracket, G, with a pivot, H, on the backside (see fig. 3) to enter the socket D and hold up the gate. This bracket extends down below the pivot, and is turned up to form the boxes for the journals of the roller I, which is arranged under the top of the bar A' of the gate to hold it up, as shown in fig. 1. This roller I may be provided with flanges to extend up each side of the bar A', or it may be made without flanges if the end of the bracket outside of the roller is made to extend up above the top of the roller to hold the bar A' on the roller when the gate is traversed. The hook J is fastened into the post F, and turned down over the lower bar to prevent cattle from raising and removing the gate.

To open this gate, it is first pushed back on the roller I until the middle bar B comes to the roller, when it is swung around to the position shown in fig. 2, which opens the passage closed by the gate.

What I claim as my invention is the single post F, provided with the eye or socket E D, and hook J, and suspended roller or pulley I, in combination with the gate A B, the several parts being arranged and operating as and for the purpose set forth.

JOHN G. TALBOT.

Witnesses:
J. DENNIS, Jr.,
TH. C. CONNOLLY.